3,484,195
SELECTIVE RECOVERY OF SALTS FROM MIXED SALT SOLUTIONS
William J. Lewis, South Ogden, Utah, and Rollin P. Smith, New Canaan, Conn., assignors to National Lead Company, New York, N.Y., a corporation of New Jersey
Filed June 20, 1967, Ser. No. 647,361
Int. Cl. C01f 5/22; C01d 5/06
U.S. Cl. 23—121                                    9 Claims

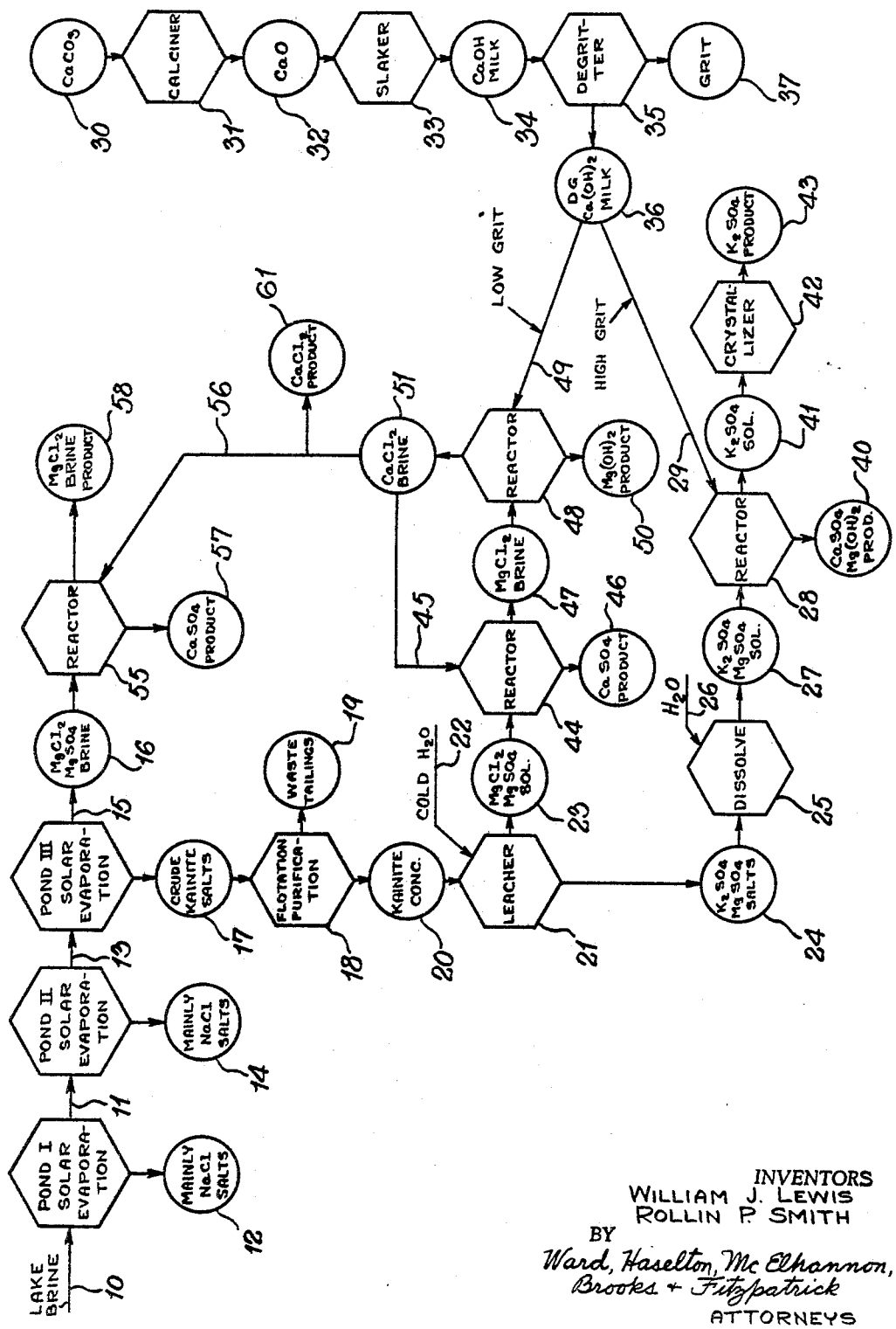

ABSTRACT OF THE DISCLOSURE

Method of treating brine containing Na, K, Mg, $SO_4$ and Cl ions for selective recovery of salts, comprising: subjecting the brine to successive concentrations initially to precipitate NaCl salts predominantly and thence impure kainite salt, desulfating the mother liquor with $CaCl_2$ to precipitate $CaSO_4$ and produce $MgCl_2$ brine which may, if desired, be concentrated to precipitate carnallite salt, separated and the $MgCl_2$ value recovered and combined with the mother liquor which is further concentrated to crystallize hydrated $MgCl_2$ salt, flotation purifying the kainite salt and leaching with cold water for decomposing into schoenite salt and $MgCl_2$ retained in solution, desulfating the leach liquor with $CaCl_2$ to precipitate $CaSO_4$ and produce $MgCl_2$ brine, reacted thence with $Ca(OH)_2$ to precipitate $Mg(OH)_2$ and produce $CaCl_2$ brine, recycled for use as above stated, reacting said schoenite in aqueous solution with $Ca(OH)_2$ to co-precipitate $CaSO_4$ and $Mg(OH)_2$, and crystallizing $K_2SO_4$ from the resulting solution.

---

This invention pertains to the selective recovery of salts from aqueous salt solutions containing a plurality of water-soluble salts, such as the chlorides and/or sulfates of sodium, potassium, magnesium, etc. The invention is more particularly concerned with the selective recovery of magnesium and potassium salts from naturally-occurring brines as found in the oceans, inland seas, salt lakes, wells and the like, disposed about the earth's surface.

Such brines in general contain sodium chloride as the major constituent, together with lesser but nevertheless substantial amounts of the chlorides and/or sulfates of potassium and magnesium as the principal remaining salts.

Although such salts are important industrially as well as necessary to all forms of life, their isolation and recovery from naturally-occurring brines is in many instances not the most economical way of obtaining the same as compared to other sources of supply, because involving in general problems of selective recovery of desired salts from the brine, and also in general the evaporation of the aqueous solvent in successive stages, which is quite expensive except where waste heat from industrial plants is available or where solar evaporation may be employed.

Where, however, solar evaporation is available throughout a large portion of the year and where the concentration of salts in the naturally occurring brine source is high, it becomes commercially feasible separately to recover therefrom by treatment in accordance with the present invention, the sodium, potassium and magnesium values as salts or bases thereof as well as calcium chloride and sulfate salts.

Natural brines containing small amounts of potassium chloride can as a rule be evaporated to produce a mixed concentrate crystallization of potassium chloride and sodium chloride. However, if the brine contains more than a specific amount of sulfate and magnesium ions, it then becomes a problem of great intricacy to recover the potassium salts. A typical example of this is the brine of the Great Salt Lake in Utah, which contains relatively high amounts of sulfate and magnesium ions. As a result, if the original brine from the lake is evaporated under relatively warm conditions until a saturated solution of magnesium salts has been obtained, it will be found that substantially all the potassium salts have been precipitated more or less completely, and that kainite (of the formula $KCl \cdot MgSO_4 \cdot 3H_2O$ or its equivalent $MgSO_4 \cdot K_2SO_4 \cdot MgCl_2 \cdot 6H_2O$), is the essential potassium-containing salt which is precipitated. This as shown by the above formula, is a double salt wherein two salts, namely, potassium chloride and magnesium sulfate or equivalent, are combined into one entity. The balance of the salts contained in the precipitate, are found to consist essentially of sodium chloride together with small amounts of other magnesium and potassium salts. The mother liquor which is left over from the precipitation is primarily magnesium sulfate and magnesium chloride in the proportions roughly of about 30% of the sulfate and 60% of the chloride.

The impure kainite salt may be purified by flotation separation and concentration employing as a flotation agent, a long chain fatty acid amine of preferably about 8 to 12 carbon atoms, such as a fatty amine acetate or chloride of such carbon chain length, and employing as a frothing agent a higher aliphatic alcohol such as amyl alcohol.

In accordance with the present invention, the purified kainite salt so obtained, $MgSO_4 \cdot K_2SO_4 \cdot MgCl_2 \cdot 6H_2O$, is leached with cold water to convert into schoenite, $K_2SO_4 \cdot MgSO_4 \cdot 6H_2O$, leaving magnesium chloride and magnesium sulfate in solution.

The schoenite salt is separately dissolved in water and reacted with aqueous calcium hydroxide to precipitate simultaneously calcium sulfate and magnesium hydroxide, thus leaving potassium sulfate in solution. The precipitate mixture of calcium sulfate and magnesium hydroxide is one of the valuable products to the process. The latter solution is concentrated until the potassium sulfate crystallizes out as one of the further valuable end products derived in accordance with the invention.

The magnesium chloride plus magnesium sulfate solution drawn off from the leaching operation is reacted with calcium chloride derived from a later stage of the process as hereinafter explained to precipitate calcium sulfate as another valuable end product according to the invention, leaving magnesium chloride in solution as a concentrated brine. This brine is reacted with aqueous calcium hydroxide to precipitate magnesium hydroxide as a further end product according to the invention, with the production of calcium chloride brine. A portion of this latter brine is used as described above. The remainder is reacted with the mother liquor comprising principally magnesium chloride plus magnesium sulfate solution drawn off from the kainite precipitation to precipitate calcium sulfate as an end product and to form a concentrated magnesium chloride brine, which latter may be further concentrated until the double salt carnallite ($KCl \cdot MgCl_2 \cdot 6H_2O$) precipitates, which is treated with water to recover the $MgCl_2$ values which are combined with the mother liquor and concentrated to dryness to produce highly concentrated magnesium chloride powder.

Calcium hydroxide employed for the various reactions aforesaid is obtained from any cheap source of calcium carbonate, such for example as oolitic sand, which abounds on the shores of the Great Salt Lake. This is calcined to form the oxide and then slaked with water to form calcium hydroxide milk which is the specific material employed in the reactions above-stated.

A feature of the invention is the method of using $Ca(OH)_2$ to precipitate simultaneously $Mg(OH)_2$ and $CaSO_4$. This method has at least three unique qualities: It is a method of cleansing liquors containing mixed sulfates of interfering ions so as to allow maximized recovery of high purity $K_2SO_4$. It is a method of producing a low boron, high grade $Mg(OH)_2$ product. This comes about because the magnesium originates, so far as the process is concerned, with flotation concentrates which are themselves boron free. The method produces a mixed $CaSO_4/Mg(OH)_2$ product of commercial value.

Considering now the process according to the invention somewhat more in detail, a naturally-occurring brine, such as sea water, lake brine or the like, for example brine from the Great Salt Lake in Utah, U.S.A., is first concentrated by evaporation, preferably by solar evaporation, until the sodium chloride is selectively crystallized out, i.e., without appreciable crystallization of the remaining salts. I have found that by employing several successive stages of such concentration and crystallization, all but a few percent of the sodium chloride may be precipitated without appreciable entrainment of the mother liquor or loss of the remaining salts. Thus I find that if the initial brine to be processed, is subjected to a first stage of evaporation until about 50–70% by weight of the total salts present have precipitated, and the solution or mother liquor drawn off and subjected to a second stage of evaporation until about one-half by weight of the remaining salts have been precipitated and the solution or mother liquor drawn off, most of the sodium chloride originally present may thus be precipitated and separated from the mother liquor which thereby becomes highly enriched with the remaining more soluble salts present, consisting principally of the chlorides and sulfates of potassium and magnesium.

I find that if this mother liquor as thus drawn off from the second stage of evaporation, is further concentrated by evaporation in a third stage until salt precipitation occurs, that depending on the temperature, the predominant constituent of the precipitate will be the double salt kainite, $MgSO_4 \cdot K_2SO_4 \cdot MgCl_2 \cdot 6H_2O$, admixed with other salts such as $MgCl_2$, $KCl$, etc. The kainite as thus obtained is in an impure state, contaminated principally by the sodium chloride retained in solution until this stage. At this stage there remains in solution in the mother liquor principally magnesium chloride and magnesium sulfate together with lesser amounts of potassium chloride and sodium chloride. When precipitation of the kainite salt has proceeded to substantial completion, the mother liquor is withdrawn from the third evaporation stage and the impure salt is then harvested and is processed as above described. The mother liquor withdrawn from the third stage of evaporation consists principally of a solution of magnesium chloride and magnesium sulfate together with lesser amounts of potassium chloride and sodium chloride, which is also processed in the manner above described.

Reference will now be had for a more detailed description of the above and other features of the invention, to the accompanying drawing comprising a flow sheet of the sequence of operations of the overall process of my invention in accordance with a preferred embodiment thereof, and as applied to processing of brine from the Great Salt Lake in Utah, U.S.A.

Referring to the flowsheet, the brine is pumped directly from the lake over a line 10 and fed into an enclosed solar evaporating Pond I. The following Table I is an assay of the lake brine as thus introduced.

TABLE I

[Stage I Feed=100% of Total]

Great Salt Lake Brine=5,654.0 Thousand Tons
Specific Gravity=1.190 at 30° C.
Percent Salinity=25.25

| | Assay wt., percent | Weight, tons×1,000 | Percent weight |
|---|---|---|---|
| Salts (ions): | | | |
| Mg | 3.05 | 43.5 | 100.00 |
| K | 1.70 | 24.3 | 100.00 |
| Na | 32.65 | 465.9 | 100.00 |
| Cl | 55.87 | 797.3 | 100.00 |
| SO₄ | 6.73 | 96.0 | 100.00 |
| Salts | 100.00 | 1,427.1 | 100.00 |
| H₂O | | 4,226.9 | |
| Total | 100.00 | 5,654.0 | 100.00 |

In Pond I the brine is subjected to solar evaporation until the specific gravity of the solution has increased from the original value of 1.190 as given in Table I to 1.245 at 30° C. at which stage the evaporation of water and precipitation of salts in Pond I, had occurred as shown in the following Table II:

TABLE II

[Evaporation]

74.02% Loss H₂O
3,129 Thousand Tons=55.34% of Total
[Stage I Salts Precipated]
868.4 Thousand Tons=15.36% of Total

| | Assay wt., percent | Weight, tons×1,000 | Percent weight |
|---|---|---|---|
| Salts (ions): | | | |
| Mg | 0.49 | 4.3 | 9.88 |
| K | 0.05 | 0.4 | 1.65 |
| Na | 38.35 | 333.0 | 71.46 |
| Cl | 59.49 | 516.6 | 64.78 |
| SO₄ | 1.62 | 14.1 | 14.70 |
| Salts | 100.00 | 868.4 | 60.85 |

At this stage the mother liquor or solution in Pond I was drawn off over a line 11 sheet and fed into a second evaporating Pond II. The salts in Pond I may then be harvested as at 12, and as shown by Table I consist principally of NaCl. The solution drawn off from Pond I had the composition given in the following Table III:

TABLE III

[Stage II Feed=29.30% of Total]

Liquor from Stage I Pond=1,656.6 Thousand Tons
Specific Gravity=1.245 at 30° C.
Percent Salinity=33.72

| | Assay wt., percent | Weight, tons×1,000 | Percent weight |
|---|---|---|---|
| Salts (ions): | | | |
| Mg | 7.02 | 39.2 | 90.12 |
| K | 4.27 | 23.9 | 98.35 |
| Na | 23.78 | 132.8 | 28.54 |
| Cl | 50.25 | 280.7 | 35.22 |
| SO₄ | 14.68 | 82.0 | 85.30 |
| Salts | 100.00 | 558.6 | 39.15 |
| H₂O | | 1,098.0 | 25.98 |
| Total | 100.00 | 1,656.6 | 29.30 |

In Pond II the brine was subjected to solar evaporation until its specific gravity had increased to 1.305 at 30° C. At this stage further evaporation had occurred and salts had precipitated as shown in the following Table IV:

TABLE IV
[Evaporation]

11.96% Loss H₂O
505.4 Thousand Tons=8.94% of Total
[Stage II Salts Precipated]
244.9 Thousand Tons=4.33% of Total

| | Assay wt., percent | Weight, tons×1,000 | Percent weight |
|---|---|---|---|
| Salts (ions): | | | |
| Mg | 0.82 | 2.0 | 4.60 |
| K | 0.61 | 1.5 | 6.17 |
| Na | 37.45 | 91.7 | 19.68 |
| Cl | 59.60 | 146.0 | 18.31 |
| SO₄ | 1.54 | 3.8 | 3.95 |
| Salts | 100.00 | 244.9 | 17.16 |

The solution or mother liquor in Pond II was then withdrawn over line 13 into a third Pond III. The salts in Pond II may then be harvested as at 14, and as shown by Table III, again are seen to consist principally of NaCl. The brine drawn into Pond III was found to assay as set forth in the following Table V:

TABLE V
[Stage III Feed=16.03% of Total]

Liquor From Stage II Pond=906.4 Thousand Tons
Specific Gravity=1.305 at 30° C.
Percent Salinity=34.62

| | Assay wt., percent | Weight, tons×1,000 | Percent weight |
|---|---|---|---|
| Salts (ions): | | | |
| Mg | 11.88 | 37.3 | 85.75 |
| K | 7.13 | 22.4 | 92.18 |
| Na | 13.11 | 41.1 | 8.82 |
| Cl | 42.97 | 134.8 | 16.90 |
| SO₄ | 24.91 | 78.2 | 81.33 |
| Salts | 100.00 | 313.8 | 21.99 |
| H₂O | | 592.6 | 14.02 |
| Total | 100.00 | 906.4 | 16.02 |

It will be observed from Tablets I–V incl., that at this stage of operations, all but a relatively small percent of the NaCl salt present in the entering lake brine had been selectively crystallized out in Ponds I and II, leaving in the mother liquor fed into Pond III only 104,600 tons of NaCl as compared to 1,179,200 tons thereof present in the original lake brine. It will be further noted from Tables II and IV, that the heavy crystallization of NaCl in Ponds I and II was accompanied by crystallization of only relatively minor amounts of the other salts contained in the entering lake brine. Hence the crystallization occurring in Ponds I and II selectively removed most of the NaCl without materially removing the remaining salts.

Reverting to the flow sheet, the mother liquor in Pond III was subjected to solar evaporation until its specific gravity had risen to 1.312 at 30° C., at which stage further evaporation had occurred and salts had crystallized out as shown in Table VI below:

TABLE VI
[Evaporation]

9.63% Loss H₂O
407.0 Thousand Tons=7.19% of Total
[Harvest Salts Precipitated]
191.4 Thousand Tons=3.39% of Total

| | Assay wt., percent | Weight, tons×1,000 | Percent weight |
|---|---|---|---|
| Salts (ions): | | | |
| Mg | 7.42 | 14.2 | 32.64 |
| K | 10.34 | 19.8 | 81.48 |
| Na | 17.30 | 33.1 | 7.10 |
| Cl | 37.11 | 71.0 | 8.90 |
| SO₄ | 27.98 | 53.6 | 55.74 |
| Salts | 100.00 | 191.4 | 13.41 |

At this stage the solution or mother liquor in Pond III was withdrawn over line 15 as at 16 of the flow sheet for further processing as hereinafter explained and, was found to be of the analysis given in Table VII below:

TABLE VII
[Mother Liquor=5.45% of Total]

Liquor From Harvest Ponds=308 Thousand Tons
Specific Gravity=1.312 at 30° C.
Percent Salinity=33.70

| | Assay wt., percent | Weight, tons×1,000 | Percent weight |
|---|---|---|---|
| Salts (ions): | | | |
| Mg | 22.25 | 23.2 | 53.54 |
| K | 2.67 | 2.8 | 11.52 |
| Na | 1.78 | 8.0 | 1.72 |
| Cl | 61.41 | 63.8 | 8.00 |
| SO₄ | 11.87 | 24.6 | 25.58 |
| Salts | 100.00 | 122.4 | 8.58 |
| H₂O | | 185.6 | 4.39 |
| Total | 100.00 | 308.0 | 5.45 |

It will be noted from Table VI that at this stage, the salts precipitated in Pond III consisted perdominantly of $MgSO_4$, $MgCl_2$ and KCl, the balance being NaCl. As against this, the mother liquor withdrawn from Pond III consisted as shown in Table VII, predominantly of $MgSO_4$ and $MgCl_2$ as indicated at 16 of the flowsheet, together with relatively small amounts of NaCl and KCl.

The crystal salt bed remaining in Pond III after withdrawal of the mother liquor, was harvested as at 17 and found to consist principally of the mixed salt kainite $KCl \cdot MgSO_4 \cdot 3H_2O$ in an impure state, being contaminated by admixture with other salts, consisting principally of NaCl.

In accordance with the processing technique according to the invention the impure kainite product as thus harvested from Pond III was purified by flotation concentration, as at 18 of the flowsheet. The waste tailings were eliminated, as at 19, and the purified kainite, as at 20, fed into a leaching tank, as at 24, wherein it was leached with cold water introduced over line 22. As a result of this leaching, the kainite salt was converted to schoenite, $K_2SO_4 \cdot MgSO_4 \cdot 6H_2O$, leaving magnesium chloride and magnesium sulfate in solution. The solution was drawn off, as at 23, and the schoenite salt harvested, as at 24, and thence dissolved as at 25, by addition of water over line 26. The resultant solution, as at 27, was then passed into a reactor 28, and reacted with calcium hydroxide milk introduced over a line 29, and obtained as follows.

A cheap source of calcium carbonate, such as oolitic sand above referred to, and employed, as at 30, as a starting material, was calcined in a calciner 31 to produce calcium oxide, as at 32, which was then slaked with water in a slaker 33 to produce calcium hydroxide milk, which was drawn off from the slaker, as at 34, and passed thence through a de-gritter 35. The degritted calcium hydroxide milk was drawn off and collected, as at 36, while the grit from the degritter was removed and collected as at 37.

A high grit portion of the degritted calcium hydroxide milk is fed from the collector 36 over the pipeline 37 into the reactor 28. In the reactor, the calcium hydroxide reacts with the potassium and magnesium sulfates in solution to precipitate calcium sulfate and magnesium hydroxide which are separated and collected, as at 40, leaving potassium sulfate in solution, which is drawn off, as at 41, and passed through a crystallizer, as at 42, to de-water and crystallize the salt which is collected as an end product in accordance with the invention, as at 43.

Meantime the solution of magnesium chloride plus sulfate withdrawn from the leacher, as at 23, is fed into a reactor 44 wherein it is reacted with calcium chloride, supplied over line 45, and obtained as described below, to precipitate calcium sulfate, which is collected as an end product, as at 46, leaving magnesium chloride in solution, which is drawn off, as at 47, and fed into a reactor 48, wherein it is reacted with a low grit portion of calcium hydroxide milk, fed thereto over line 49 from the source 36.

In the reactor 48, the calcium hydroxide reacts with the magnesium chloride brine to precipitate magnesium hydroxide which is separated and withdrawn as an end product, as at 50, leaving calcium chloride in solution. The latter is drawn off as at 51, and a portion thereof fed over line 45, to the reactor 44 for providing the reactions therein above described.

Meantime the mother liquor from Pond III, consisting principally of magnesium chloride plus magnesium sulfate in solution, as at 16, is fed to a reactor 55 wherein it is reacted with a portion of calcium chloride brine from source 51, fed thereto over line 56. In the reactor 55 the calcium chloride reacts with the magnesium sulfate to precipitate calcium sulfate which is separated and collected as an end product, as at 57, leaving magnesium chloride in solution, which is drawn off as at 58. This brine may be further concentrated to precipitate the double salt carnallite, which is separated and washed with water to dissolve the magnesium chloride values, leaving an essentially KCl/NaCl precipitate while the $MgCl_2$ solution is combined with the mother liquor and the resultant solution concentrated to dryness to produce a spray-dried solid magnesium chloride salt powder in the manner described in a copending application of L. W. Ferris, Ser. No. 400,994, filed Oct. 2, 1964, of common ownership with the instant application. The excess of calcium chloride brine produced in reactor 51, over and above that required for the reactors 44 and 51, is collected as an end product, as at 61.

What is claimed is:

1. The method of recovering potassium and magnesium values from an aqueous salt solution containing chloride and sulfate salts of sodium, potassium and magnesium, which comprises: concentrating said solution to precipitate the major portion of the sodium salts and separating said sodium salts therefrom, concentrating the resulting solution to precipitate impure kainite salt, separating said impure kainite salt from the mother liquor and purifying by flotation to eliminate contaminating salts, leaching said purified kainite salt with cold water to convert said kainite salt to schoenite salt and separating said schoenite from the leach liquor having magnesium chloride and magnesium sulfate in solution in the leach liquor, dissolving said schoenite salt in water and reacting it therein with calcium hydroxide to precipitate both calcium sulfate and magnesium hydroxide as a high purity mixed $CaSO_4/Mg(OH)_2$ product and separating said last-mentioned product from the solution and crystallizing high purity potassium sulfate salt from the resulting solution.

2. The method of recovering potassium and magnesium values from an aqueous salt solution containing chloride and sulfate salts of sodium, potassium and magnesium, which comprises: concentrating said solution to precipitate the major portion of the sodium salts and separating said sodium salts therefrom, concentrating the resulting solution to precipitate impure kainite salt, separating said impure kainite salt from the mother liquor and purifying by flotation to eliminate contaminating salts, leaching said purified kainite salt with cold water to convert said kainite salt to schoenite salt and separating said schoenite salt from the leach liquor leaving magnesium chloride and magnesium sulfate in solution in the leach liquor, reacting said schoenite salt in aqueous solution with calcium hydroxide to precipitate both calcium sulfate and magnesium hydroxide as a high purity mixed $CaSO_4/Mg(OH)_2$ product, separating said last-mentioned product from the solution and crystallizing high purity potassium sulfate from the resulting solution, desulfating said magnesium sulfate-magnesium chloride leach liquor with calcium chloride to precipitate calcium sulfate, separating the calcium sulfate from the liquor to provide magnesium chloride brine, reacting said brine with calcium hydroxide to precipitate high purity magnesium hydroxide and produce calcium chloride brine, and cycling said-mentioned brine in part to said desulfating stage for desulfating said leach liquor.

3. The method according to claim 2 wherein the mother liquor from said kainite precipitation stage is desulfated with a portion of said calcium chloride brine to precipitate calcium sulfate which is separated from the resultant magnesium chloride brine.

4. The method according to claim 3 wherein calcium carbonate is calcined and thence slaked to produce calcium hydroxide milk which is degritted, and the degritted milk cycled in part for reaction with said aqueous schoenite solution, and in part for reaction with said desulfated magnesium chloride brine, both from said leaching stage.

5. The method according to claim 3 wherein said desulfated magnesium chloride brine from said kainite precipitation stage is concentrated to precipitate carnallite salt which is separated from the resultant mother liquor and treated with sufficient water to dissolve the magnesium chloride content, the solution of which is combined with said mother liquor and the resultant magnesium chloride brine concentrated to precipitate hydrated magnesium chloride salt.

6. The method of producing high purity potassium and magnesium salts from crude kainite salt which comprises: purifying said crude kainite salt by flotation concentration to eliminate contaminating salts, leaching the purified kainite salt with cold water for conversion to schoenite salt, separating the schoenite salt from the leach liquor and dissolving it in water, and reacting the schoenite salt in such aqueous solution with calcium hydroxide to precipitate a high purity mixed mixture of $CaSO_4$ and $Mg(OH)_2$ product and separating such product from the solution, and crystallizing $K_2SO_4$ salt of high purity from said solution.

7. The method of producing high purity potassium and magnesium salts from crude kainite salt which comprises: purifying said crude kainite salt by flotation concentration to eliminate contaminating salts, leaching the purified kainite salt with cold water for conversion to schoenite salt and reacting the latter in aqueous solution with calcium hydroxide to precipitate a high purity mixed $CaSO_4/Mg(OH)_2$ product, separating such product from the solution, crystallizing $K_2SO_4$ salt of high purity from said solution, desulfating the leach liquor from said kainite leaching with calcium chloride brine, reacting the resulting magnesium chloride brine with aqueous calcium hydroxide to precipitate $Mg(OH)_2$ of high purity, and separating said precipitate from the resulting calcium chloride brine.

8. The method according to claim 7 wherein said calcium chloride brine is recycled in part for desulfating said leach liquor and in part for desulfating said mother liquor from said kainite precipitation.

9. The method of treating kainite salt for selectively recovering potassium and magnesium values, which comprises: leaching said kainite salt with cold water for conversion to schoenite salt and leach liquor containing potassium and magnesium sulfates, separating said schoenite salt from the leach liquor and forming an aqueous solution thereof, reacting said schoenite salt in said solution with calcium hydroxide milk to precipitate calcium sulfate and magnesum hydroxide as a mixture of $CaSO_4$ and $Mg(OH)_2$, separating said precipitate from the solution, and concentrating said solution to precipitate high purity potassium sulfate, desulfating said leach liquor with calcium chloride to precipitate $CaSO_4$ and separating the precipitate from the resulting magnesium chloride brine, reacting said brine with calcium hydroxide milk to precipitate $Mg(OH)_2$, separating the precipitate from the resulting calcium chloride brine and recycling said brine for desulfating said leach liquor.

(References on following page)

References Cited

UNITED STATES PATENTS

| | | | |
|---|---|---|---|
| 1,505,202 | 8/1924 | Judd | 23—201 |
| 2,465,264 | 3/1949 | Pike | 23—201 |
| 2,573,616 | 10/1951 | Seailles | 23—201 |
| 2,759,794 | 8/1956 | Fuchsman | 23—201 |
| 2,902,343 | 9/1959 | Saccardo | 23—121 |
| 3,099,528 | 7/1963 | Hadzeriga | 23—38 |

OTHER REFERENCES

Chemical Abstracts; vol. 54, p. 6052c.

OSCAR R. VERTIZ, Primary Examiner

G. O. PETERS, Assistant Examiner

U.S. Cl. X.R.

23—38, 201